Patented Dec. 8, 1931

1,835,420

UNITED STATES PATENT OFFICE

KARL NEUNDLINGER, OF DESSAU IN ANHALT, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF SILICIC ACID SOLS

No Drawing. Application filed April 17, 1928, Serial No. 270,798, and in Germany July 21, 1927.

My invention relates to pure and durable silicic acid sols of high concentration and to a process of manufacture thereof. It is based on the observation that it is easy to make such sols of high percentage strength by peptization of silicic acid gels of a content of about 7–15 per cent $SiO_2$ made and purified in the known manner without further dilution with water in the presence of a very small proportion of ammonia, this peptization being carried out by heating the gel for some time to a raised temperature without evaporation of water until a solution is obtained.

Preferably there is first obtained a rich silicic acid gel from water-glass and acid or from silicon halide and after comminution this is purified in known manner from soluble constituents. The purified gel is then treated with a small proportion of ammonia, the excess of water being separated again. For instance the gel may be allowed to lie for some time in an ammonia solution of 0,5–1 per cent strength and is then removed, or the gel may be treated for a short time with ammonia gas, or the unpurified gel may be purified by means of water containing ammonia. When the gel thus pretreated is so heated in a vessel that evaporation of water is avoided it becomes completely liquefied in the course of 24–48 hours. There is obtained directly a sol having the same silicic acid contents as that of the gel. For instance from a gel containing 10 per cent $SiO_2$ there may be produced a sol containing 10 per cent $SiO_2$. It is remarkable how easily the gel dissolves in the absence of a diluent, particularly when it is subjected to the peptization without further comminution, that is to say in pieces. It is preferable to use the gel in pieces of about 1–6 centimeter diameter, the size in which it is usually subjected to treatment with water to remove the soluble constituents.

The sol produced contains a small proportion of ammonia which may be almost completely separated by blowing it out with air. In this manner sols containing up to 15 per cent of silica can be made. The advantage of the process resides in the fact, that very stable sols of high percentage strength are made directly with an extremely small consumption of ammonia, which indeed is only a fraction of the proportion usually required. Concentration of a dilute sol which always entails loss is avoided. The sols which obviously can be made of any desired strength are particularly suitable for impregnating purposes and as adhesives. These sols of high percentage strength also present advantages for the production of porous active masses and as carriers for catalysts.

The following example serves to illustrate the invention, the parts being by weight:

A silicic acid gel containing 7–11 parts of $SiO_2$ is cut in small bits and purified by washing with water. For 100 parts of $SiO_2$ 2,5 parts of $NH_3$ in form of aqueous ammonia are added to the water for washing so that it contains 0,5 per cent of $NH_3$. The ammonia is partly adsorbed by the silicic acid gel, in this special case 1,25 parts. The gel remains for 6–12 hours in the ammoniacal liquor and is then removed from it. Finally it is heated for 24 hours without further dilution with water to 100° C. in such a manner, that evaporation of water is avoided. Then it is in a liquefied state. The ammonia partly escapes whilst liquefying the gel; it may be eliminated nearly completely by blowing air through the solution.

It is obvious to all skilled in the art that my invention is not limited to the details given in the foregoing example. Silicic acid gels of other concentration may be used whereby sols of a corresponding content of $SiO_2$ are obtained. The use of ammonia in other concentrations varies the duration of the liquefying process. Heating to a lower temperature as 100° C. prolongs the process whilst a higher temperature shortens it; in the latter case a closed vessel is required.

What I claim is:—

1. A process of manufacture of silicic acid sols of high percentage strength which consists in treating a silicic acid gel containing about 7–15 per cent of $SiO_2$ with a small proportion of ammonia and subjecting it without further dilution for some time to a raised temperature without evaporation of water until a solution is produced.

2. A process of manufacture of silicic acid sols of high percentage strength which consists in heating a purified silicic acid gel containing 7-15 per cent of $SiO_2$ in the presence of 0.5-2.5 per cent of $NH_3$, calculated on the $SiO_2$ used, to a raised temperature without evaporation of water.

3. A process of manufacture of silicic acid sols of high percentage strength which consists in heating a purified silicic acid gel containing 7-15 per cent of $SiO_2$ in the presence of 0.5-2.5 per cent of $NH_3$, calculated on the $SiO_2$ used, to a temperature of 90-100° C. without evaporation of water.

In testimony whereof, I affix my signature.

KARL NEUNDLINGER.